Dec. 22, 1931. L. W. HEFFELFINGER ET AL Re. 18,295

BLEEDER ATTACHMENT FOR AIR BRAKES

Original Filed May 21, 1926

Inventors:
LeRoy W. Heffelfinger
Louis J. Courtney
By Jones, Addington, Cramer & Seibold
Attys.

Reissued Dec. 22, 1931 Re. 18,295

UNITED STATES PATENT OFFICE

LEROY W. HEFFELFINGER AND LOUIS J. COURTNEY, OF CHICAGO, ILLINOIS, ASSIGNORS, BY MESNE ASSIGNMENTS, TO SAID LEROY W. HEFFELFINGER AND LOUIS J. COURTNEY AND RAY C. HEFFELFINGER AND HARLAN W. HEFFELFINGER, BOTH OF BEATRICE, NEBRASKA

BLEEDER ATTACHMENT FOR AIR BRAKES

Original No. 1,619,821, dated March 8, 1927, Serial No. 110,685, filed May 21, 1926. Application for reissue filed August 4, 1928. Serial No. 297,450.

This invention relates, generally, to pressure systems, but has particular relation to a bleeder or relief-valve mechanism, or attachment, to be used in connection with air-brake mechanism of the ordinary or any preferred construction, as generally employed in railway equipment, to bleed the auxiliary reservoirs and brake-cylinders at the required or desired time or times to release the brakes previously set or applied, by the pressure from said reservoirs and cylinders.

Heretofore, the above named operation of bleeding the said parts, has been accomplished with a great loss of time by the operator, due to the fact, that it has in the structures generally in common use, for such purpose, been necessary for him to hold the valve of each relief-valve or bleed-cock open until the brakes have been fully released.

The principal object of our invention is, to provide a bleed attachment for air-brake mechanism, which shall be extremely simple and inexpensive in construction, strong, durable, highly efficient in operation, and so made and with its parts so arranged as to be readily applied to air-brake mechanism of a well known construction, if desired, without materially altering any of the parts thereof.

Another and important object of the invention is, to furnish in an attachment of the kind herein set forth, means whereby the operation of bleeding the various auxiliary reservoirs and brake-cylinders of a train of cars, can be performed from either side of the train and in such a way, that the act, will require an instant only, for each relief or bleed valve, of the operator's time.

A further object is, the provision of means in our invention, whereby the closure or seating of the bleed or relief-valve will be automatically effected in the release movement of the piston of the brake-cylinder.

Various other objects and advantages of our invention will be disclosed and become obvious from the following description and explanation, which will be more readily understood when read in conjunction with the accompanying drawing, which serves to illustrate an embodiment of which the invention is susceptible, it being understood that changes and modifications may be resorted to without departing from the spirit of the invention, so long as they fall within the scope of the appended claims forming a part hereof.

In the drawings:—

Like numerals of reference refer to corresponding parts throughout the different views of the drawing.

Figure 1:
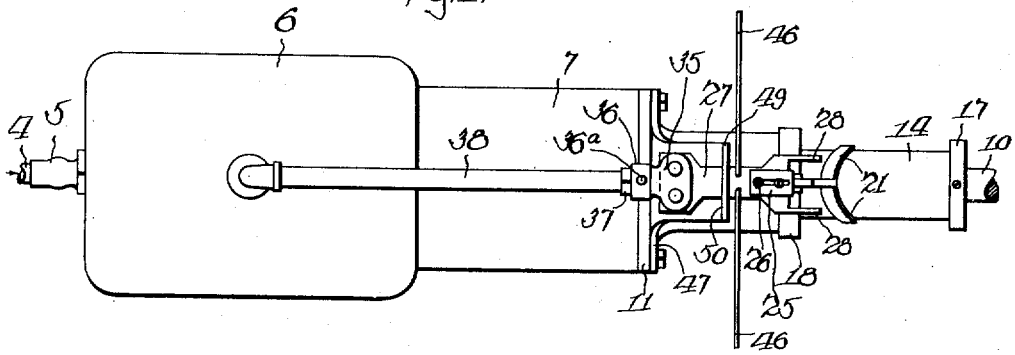
Fig. 1 is a plan view of a portion of the main pipe or line, an auxiliary reservoir, and a brake-cylinder of an air brake mechanism for railway cars, showing our improvements in place thereon and in about the positions they will occupy when the brakes are set.
Figure 2:
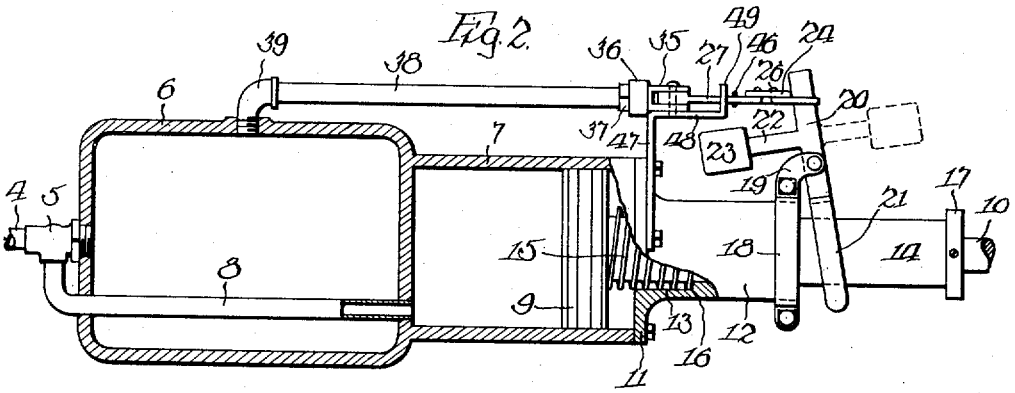
Fig. 2 is a side view of like parts, showing portions thereof in section and others in elevation.

Referring now more particularly to Figs. 1 and 2 of the drawings, the main or train-pipe which leads from the locomotive (not shown) to an auxiliary valve, is indicated by the reference numeral 4, which pipe is connected in communication with said auxiliary reservoir by means of a controlling valve 5, which forms no part of our invention, but may be like those found in ordinary air brake construction. The reference numeral 6 designates an auxiliary reservoir supported by the bottom of a car (not shown) in the usual manner and the brake-cylinder is indicated by the numeral 7, and as shown, directly connected to the auxiliary reservoir 6, but may be spaced from said reservoir and located more or less remotely therefrom.

Extending from the reservoir 6, through the same but communicating at one of its ends with the valve casing 5, and at its other end with the brake-cylinder 7, is a pipe 8. The brake-cylinder 7 is provided with a piston 9, which is mounted for reciprocation in said cylinder on the inner end of a rod 10, which is connected at its other end in the usual way with the equalizer (not shown) of the brake mechanism. The outer head 11 of said cylinder is provided with an outward extension or neck 12, the bore 13, of which is somewhat larger at its portion adjacent the piston 9, than a hollow piston rod 14 adapted to receive the rod 10. A spring 15 is coiled around the rod 14 and rests at one of its ends against the outer surface of the piston and at its other end against a shoulder 16, at the outer end of the bore 13, in the neck or extension 12 of the outer cylinder head. By this arrangement, it will be understood that that portion of the neck 12, between the shoulder 16, and the outer end of said neck will provide a bearing for the rod 14, in which the rod 10 moves. It will be understood that the inner end of the rod 14 is secured to the piston 9 in any desired way. The relation between piston rod 14 and brake connecting rod 10 is well known to those skilled in the art. The outer end of the rod 14 has mounted thereon a collar 17, and the outer end of the neck or extension 12 is surrounded by and has fixed thereto a two-piece yoke or collar 18, which is provided at its upper portion with a forked bracket 19, which is slightly off-set rearwardly as shown in Fig. 2 of the drawings. Between the forks of the bracket is fulcrumed a piston lever 20, the lower portion of which is provided with prongs 21, which strike the rod 14, between the collar 17 on said sleeve and the member 18 on the outer end of the extension 12. The upper portion of the piston lever 20 is provided with an arm 22 having a weight 23 thereon and extended towards the cylinder 7, as shown in Fig. 2 of the drawings, in which view it will be observed that the upper portion of the lever 20 rests upon a wearing plate 24, adjustably secured by means of a longitudinal slot 25, therein and a pair of bolts 26 seated in the outer portion of the operating lever 27 for the bleed valve and extended through said slot, when the brakes are set and the parts are in the positions shown in Figs. 1 and 2 of the drawings.

Figure 3:
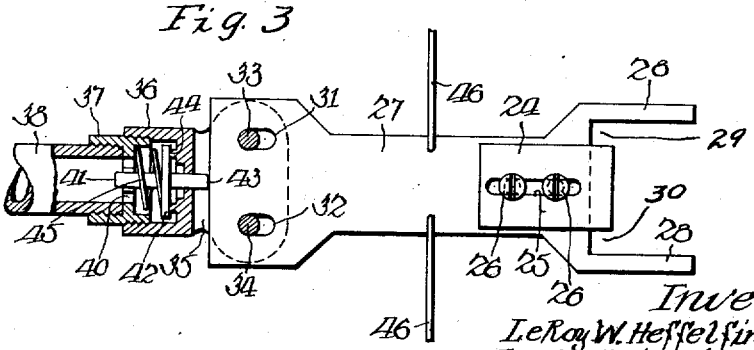
Fig. 3 is an enlarged detached plan view of a portion of the bleed valve and the operating lever therefor, the casing of said valve being shown in horizontal section.

The operating lever 27 is, as clearly shown in Fig. 3, of the drawings, provided at its outer end with a pair of outwardly extended prongs 28, which are spaced from one another and also from the side edges of the wearing plate 24, thus affording the recesses 29 and 30 between said prongs and the outermost end of the wearing plate 24, which plate preferably extends a slight distance outwardly from the lever 27, and as before stated is adjustably secured in position. The other end of the operating lever 27, is, by preference, widened and provided near its said widened end with a pair of longitudinal slots 31 and 32 for pivots 33 and 34, respectively, on which pivots the lever 27, fulcrums one at a time, owing to the direction in which the lever may be turned.

As shown in the different views of the drawings, the lever 27, is operatively connected by means of the pivots or fulcrums 33, and 34, to the forked shank 35, of the bleed-valve-casing 36, which shank is by preference longitudinally slotted as shown and is provided at one end of the said casing 36, the other end of said casing, being connected by means of a screw threaded nipple 37, with one end of a pipe 38, the other end of which is in communication with the auxiliary reservoir 6, by means of a coupling 39. The nipple 37, which is in screw engagement with one end of the pipe 38, is provided with a transversely disposed web 40, having a central opening for the operation of the valve stem 41, of the valve 42, which is fixed on the stem 41, at about its middle, and extends through the valve casing 36, and impinges with one end against the adjacent end of the operating lever 27, as shown at 43, in Fig. 3, of the drawings. The valve 42, is adapted to rest on a valve seat 44, surrounding the stem 41, when the brakes are in their applied positions. A coiled spring 45, is interposed between the web 40, of the nipple 37, and the valve 42, serves to hold the valve in its closed position as is obvious.

Extended from each side of the operating lever 27, and usually pivotally connected thereto is an operating rod 46, by the instrumentality of which the operator can move the lever 27, from either side thereof and in opposite directions as will be presently explained.

Fixed on the outer head 11, of the brake-cylinder 7, and extending laterally therefrom to a point near the exhaust pipe 38, or rather the shank of the bleed-valve-casing 36, is a bracket 47, which has a supporting portion 48, for said shank extended longitudinally with the cylinder 7, and with an out turned flange 49, having a slot 50, through which the operating lever is extended and on the floor of which it may rest. The operating rods 46, for the lever 27, are by preference connected to said lever between the flange 49, of the bracket 47, and the wearing plate 24, as shown in the different views of the drawings.

The pressure through the main or train-pipe 4, is controlled from the cab of the engine and normally the circuit is through said line, the valve 5, auxiliary reservoir 6, and when the brakes are set the engineer's valve is operated to throw the pressure from the auxiliary reservoir to the brake-cylinder to operate the piston therein and thereby apply the brakes, as is well known.

The operation of our device is simple and as follows: Assuming that there is the requisite amount of pressure in the reservoir 6, and cylinder 7, to firmly set the brakes, the parts will occupy positions shown in the different views of the drawings, particularly, Figs. 1 and 2 thereof. Now, when it is desired to bleed the reservoir and to release the brakes, all that is necessary is to move the operating lever 27, by means of one of the rods 46, which may extend from said lever to the sides of the cars or slightly beyond the same, to be laterally taken hold of, so that the lever 27 will fulcrum on one of the pins 33, or 34, for instance on the last named pin, when it is obvious the slot 31, in which the pin 33 is located will permit the lever 27 to pivot on the pin 34 and to assume such a position as to cause the valve stem 41 to be moved against the tension of the spring 45, which normally actuates it, thus removing the valve 42 from its seat and thereby permitting the escape of air through the small bleed opening 36[a], see Fig. 1, in the valve casing of the bleed valve. When in such position as just above described, it will be understood that the lever 27 will have been moved to such an extent as to permit the upper portion of the lever 20 to pass into the recess 30 by reason of the gravity exerted by the weight 23 on said lever where it will be held without the further attention of the operator. When the pressure within the reservoir and brake-cylinder has been sufficiently reduced, it is apparent that the spring 15 exerted on the piston 9 will cause the latter to move in the direction of the reservoir or toward its head opposite the extension 12, in which operation the collar 17 will strike the prongs 21, on the lower portion of the lever 20, and cause said lever to be disengaged from the edge of the wearing plate 24, which edge forms one side of the recess 30, in which the lever 20 has just been located. At this time the piston will have reached the limit of its release movement and the spring 45, exerting its tension on the valve 42, will through the stem 41 cause the operating lever 27 to assume its normal position, thus causing the lever 20 to assume the positions shown in the drawings. Of course, it will be understood that by moving the lever 27 in a direction opposite to that just above described, the said lever will fulcrum on the pivot 33, when the operation of the parts will be the same as above described except that the piston lever 20 will be located in the recess 29 afforded by the prong 28 of the lever 27, and the adjacent side edge of the wearing plate.

While our invention is ordinarily positioned horizontally below the car bottom on which it is employed, with the bleed pipe 38, and its valve above the reservoir and cylinder, yet it is obvious that said position may be reversed, that is to say, placed in such a way that the bleed valve will be located below the cylinder, by simply changing the position of the weighted arm 22, to the opposite side of the piston lever from that shown in the drawings.

Having thus fully described our invention, what we claim as new and desire to secure by Letters Patent is:—

1. In an attachment for air-brakes of the class described, the combination with a train-pipe, of an auxiliary reservoir and brake-cylinder communicatable therewith, a bleed pipe communicating at one of its ends with said reservoir and having its other end located adjacent the said cylinder, a valve-casing having a bleed opening and secured to the bleed pipe, a spring-pressed valve within said casing and having a stem extended therefrom, a manually operated valve-lever having two fulcrums whereby it may be operated in opposite directions, said valve-stem contacting with one end of said valve-lever, and weighted means co-operating with said valve lever and extended into the path of travel of a movable part carried by said brake-cylinder.

2. In an attachment for air-brakes of the class described, the combination with a train-pipe, of an auxiliary reservoir and brake-cylinder communicatable therewith, a bleed pipe communicating at one of its ends with said reservoir and having its other end located adjacent the said cylinder, a valve-casing having a bleed opening and secured to the bleed pipe, a spring-pressed valve within said casing and having a stem extended therefrom, a manually operated valve-lever having two fulcrums whereby it may be operated in opposite directions, said valve-stem contacting with one end of said valve-lever and a weighted lever co-operating at one of its ends with said valve-lever and adapted at its other end to be actuated in one direction by the release movement of the piston of said cylinder.

3. In an attachment for air-brakes of the class described, the combination with a train-pipe, of an auxiliary reservoir and brake-cylinder communicatable therewith, a bleed pipe communicating at one end of its ends with said reservoir and having its other end located adjacent the said cylinder, a valve-casing having a bleed opening and secured to the bleed pipe, a spring-pressed valve within said casing and having a stem extended therefrom, a manually operated valve-lever having two fulcrums whereby it may be operated in opposite directions, said valve-stem contacting with one end of said valve-lever, a weighted lever tripplingly cooperating at one end of its ends with said valve-lever and striding at its other end a movable part by said cylinder and a stop on said movable part.

4. An attachment of the class described, comprising a bleed-pipe having a bleed-valve, a lever cooperating with said valve for the operation thereof and provided at its end opposite the valve with a pair of spaced recesses, a weighted lever located normally near one of its ends against the valve operating lever between its recesses and provided with a portion or part extended into the path of travel of a movable part operated by the piston of the brake-cylinder.

5. In a bleeder, the combination with an air brake cylinder provided with a brake piston rod, a bleeding valve and a valve operating lever, a latch arm pivotally mounted to swing in the direction of movement of said piston rod, said latch arm cooperating with said operating lever to lock said operating lever in a position to hold said valve in open position, and means actuated by the piston rod to engage and release said latch arm when the piston rod has moved a predetermined distance toward the cylinder.

6. In a bleeder, the combination with an air brake cylinder provided with a brake piston rod, a bleeding valve and a valve operating lever, and arm pivotally mounted to swing in the direction of movement of said piston rod, there being means cooperating with said arm to lock said operating lever in a position to hold said valve in open position, and means actuated by the piston rod to release said arm when the piston rod has moved a predetermined distance toward the cylinder.

7. In a bleeder, the combination with an air brake cylinder provided with a brake piston rod, a bleeding valve and a valve operating lever, an arm pivotally mounted to swing in the direction of movement of said piston rod, said arm cooperating with said operating lever to lock said operating lever in a position to hold said valve in open position, and means actuated by the piston rod to release said arm when the piston rod has moved a predetermined distance toward the cylinder.

In testimony whereof, we have subscribed our names this 28th day of July, 1928.

LEROY W. HEFFELFINGER.
LOUIS J. COURTNEY.